United States Patent
Perkinson

(10) Patent No.: US 8,757,972 B2
(45) Date of Patent: Jun. 24, 2014

(54) DE-ICING SYSTEM FOR MODULAR COUNTER ROTATING PROPELLER

(75) Inventor: Robert H. Perkinson, Stonington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 389 days.

(21) Appl. No.: 13/208,741

(22) Filed: Aug. 12, 2011

(65) Prior Publication Data

US 2013/0039759 A1  Feb. 14, 2013

(51) Int. Cl.
 *F01D 1/26* (2006.01)
 *F01D 25/02* (2006.01)

(52) U.S. Cl.
 USPC ................................. 416/1; 416/39; 416/129

(58) Field of Classification Search
 CPC ......... F01D 25/02; F01D 1/26; B64C 11/306; B64C 11/308; B63H 5/10; Y02T 50/66
 USPC .................................. 416/1, 39, 95, 128, 129
 See application file for complete search history.

(56) References Cited

U.S. PATENT DOCUMENTS

| | | | |
|---|---|---|---|
| 2,429,061 A | 10/1947 | Hunter | |
| 5,704,567 A | 1/1998 | Maglieri | |
| 5,709,532 A * | 1/1998 | Giamati et al. | 416/39 |
| 6,137,082 A | 10/2000 | Pruden et al. | |
| 6,753,513 B2 | 6/2004 | Goldberg et al. | |
| 6,769,874 B2 | 8/2004 | Arel | |
| 6,906,537 B2 | 6/2005 | Goldberg et al. | |
| 2010/0013348 A1 | 1/2010 | Carvalho | |
| 2010/0236849 A1 | 9/2010 | Wishart | |
| 2011/0024567 A1 | 2/2011 | Blackwelder et al. | |
| 2011/0025157 A1 | 2/2011 | Blackwelder et al. | |

FOREIGN PATENT DOCUMENTS

GB  2145777  *  4/1985

* cited by examiner

*Primary Examiner* — Edward Landrum
*Assistant Examiner* — Liam McDowell
(74) *Attorney, Agent, or Firm* — Carlson, Gaskey & Olds, P.C.

(57) ABSTRACT

A disclosed example self-contained counter rotating turbo prop system includes a power generating system that produces electric power for a de-icing system. A bearing/generator assembly includes a plurality of permanent magnets and coil assemblies separated by an air gap. Relative rotation between first and second parts of the bearing/generator assembly provides for the generation of electric power utilized to drive the heating elements mounted to the propeller blades.

18 Claims, 4 Drawing Sheets

DE-ICING SYSTEM FOR MODULAR COUNTER ROTATING PROPELLER

BACKGROUND

This disclosure generally relates to a counter-rotating propeller system including a collective blade angle actuator for adjusting propeller blade pitch. More particularly, this disclosure relates to a device and method of generating power for de-icing the propeller blades.

De-icing systems to minimize ice accumulation on aircraft surfaces utilize a heating element that is applied to an airfoil surface such as a leading edge of a wing or a rotating propeller blade. The heating element may include an electrically powered resistive heating mat that is mounted to a surface of the airfoil. Power to generate heat and control of the heating element is provided by systems within the aircraft. A rotating propeller blade presents a challenge of transferring electric power from the stationary airframe to the rotating propeller blade. Typically a slip ring and brush combination is utilized to communicate electric power to the propeller blades. The slip ring brush combination is a high wear part that requires continual maintenance and monitoring. Moreover, losses through the slip ring and brush interface require added electric power. The maintenance and monitoring problems are compounded for counter rotating propeller systems.

SUMMARY

A disclosed example self-contained counter rotating turbo prop system includes a power generating system that produces electric power for a de-icing system. The disclosed counter rotating propeller system is driven by a gas turbine engine through a reduction gearbox. A first plurality of propeller blades rotate in a first direction and a second plurality of propeller blades rotate in an opposite direction about a common axis.

Each of the propeller blades includes a heating element that provides a de-icing function. The counter rotating propeller system includes an integral generator for developing electric power to operate the heating elements. A translation mechanism for varying propeller pitch of both sets of propeller blades includes a bearing/generator assembly. The bearing/generator assembly includes a plurality of permanent magnets and coil assemblies separated by an air gap. Relative rotation between first and second parts of the bearing/generator assembly provides for the generation of electric power. The electric power created by the bearing/generator assembly provides the electric energy required to drive the heating elements mounted to the first and second pluralities of propeller blades.

These and other features disclosed herein can be best understood from the following specification and drawings, the following of which is a brief description.

DETAILED DESCRIPTION

Figure 1:
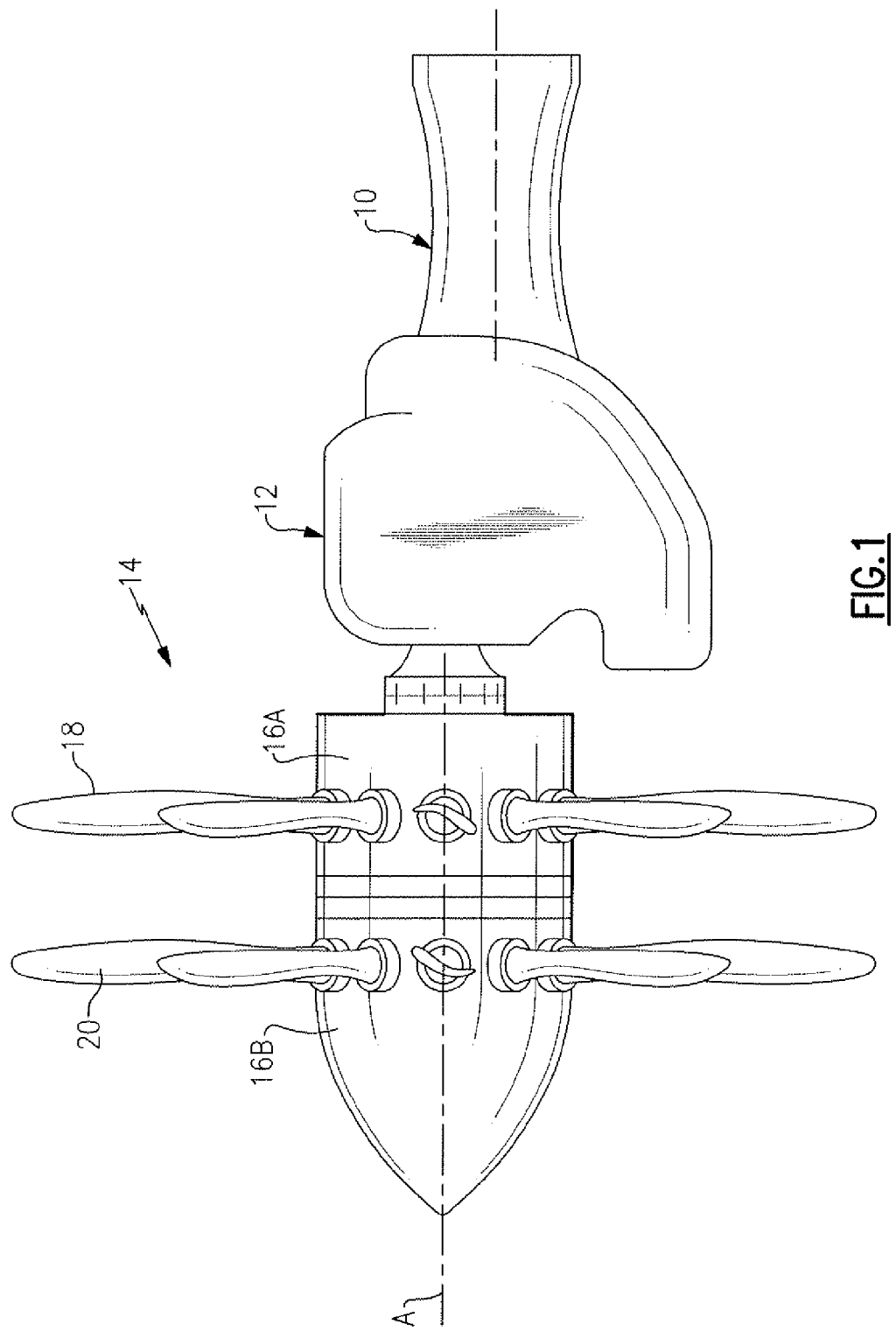
FIG. 1 is a schematic representation of an example modular counter rotating propeller system.

Referring to FIG. 1, an example self-contained counter rotating turbo prop system 14 is driven by a gas turbine engine 10 through a reduction gearbox 12. The counter rotating propeller system 14 drives a first plurality of propeller blades 18 in a first direction about a main axis A and a second plurality of propeller blades 20 in an opposite direction about the same axis A.

Each of the propeller blades 18, 20 include a heating element 48, 50 (FIG. 2) that provides a de-icing function. The counter rotating propeller system 14 includes an integral generator (best shown in FIG. 4) for developing electric power to operate the heating elements 48, 50. The propeller system 14 is covered by cowlings (also sometimes referred to as spinners) 16A, 16B. The cowlings 16A and 16B cover a gear train that provides the counter-rotation of the first and second pluralities of propeller blades 18, 20. The entire counter-rotating propeller system 14 including the generator is disposed within the cowlings 16a and 16b and is separate from the gas turbine engine 10 and reduction gearbox 12.

Figure 2:
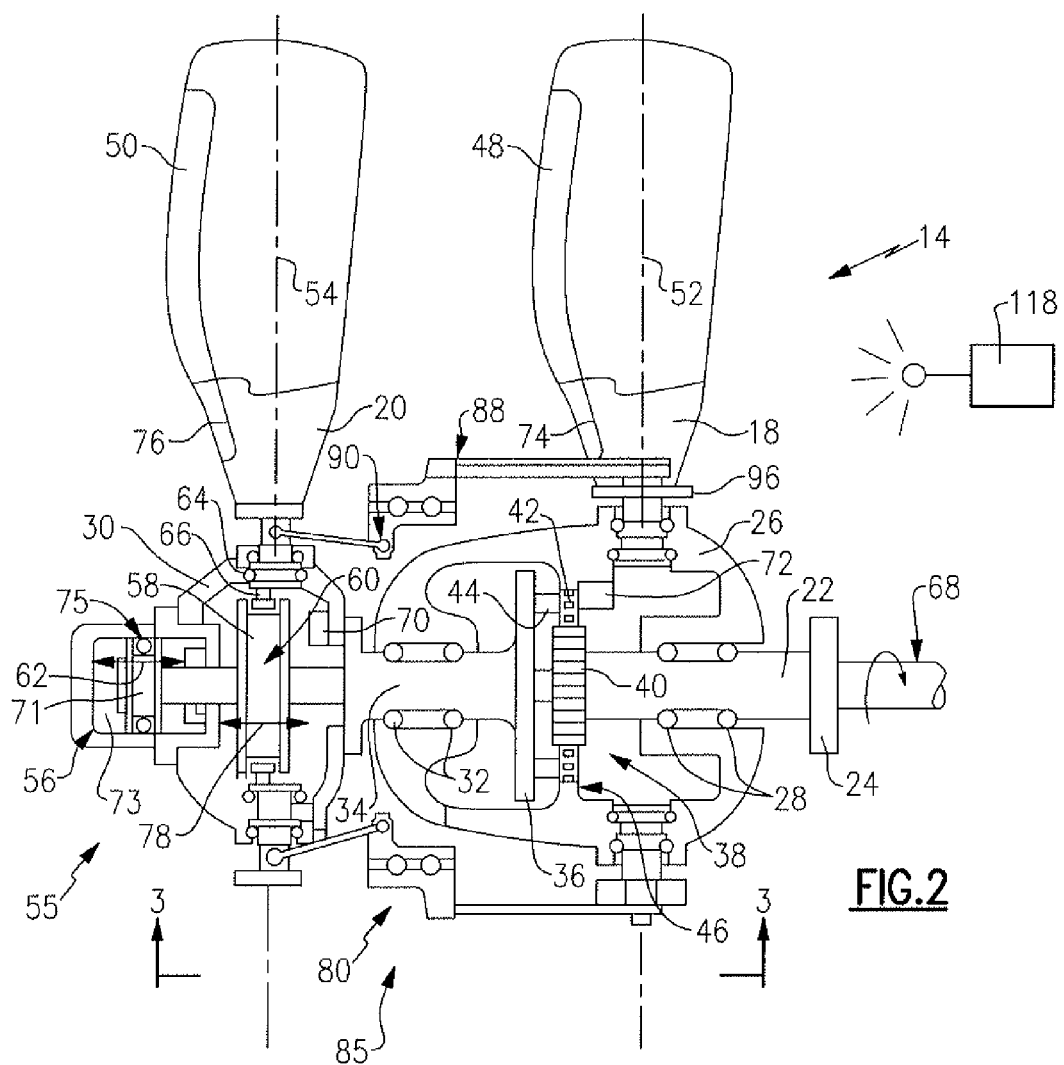
FIG. 2 is a cross-sectional view of an example counter rotating propeller system.

Referring to FIG. 2, the example counter rotating propeller system 14 includes a first hub 26 that supports the first plurality of propeller blades 18 and is supported about a first input shaft 22. The input shaft 22 includes a flange 24 that provides for securing the input shaft 22 to the reduction gearbox 12. No other driving connection is required between the reduction gearbox and the example counter rotating propeller system 14.

The first hub 26 is supported on bearings 28 for rotation about the input shaft 22. The first hub 26 is supported on the input shaft 22 but is rotatable independent of rotation of the input shaft 22. A second input shaft 34 is supported within the first hub 26 by bearings 32 and is rotatable independent of both the first hub 26 and the input shaft 22. A second hub 30 is attached to the second input shaft 34 and rotates with the second input shaft 34.

The first input shaft 22 provides the driving input to a planetary gear train 38. The example planetary gear train 38 includes a sun gear 40 that is mounted to the input shaft 22. The sun gear 40 is driven by the input shaft 22 at the speed of the input shaft 22. Surrounding the sun gear 40 are a plurality of planet gears 42 that are supported on a planet carrier 44. The planet carrier 44 is in turn supported by a flange 36 of the second input shaft 34. The planet gears 42 in turn drive a ring gear 46. The ring gear 46 is defined on an inner surface of the first hub 26. The ring gear 46 drives rotation of the first hub 26. Accordingly, the planetary gear train 38 translates input from the first input shaft 22 into counter rotation of the first and second plurality of propeller blades 18, 20.

Figure 3:
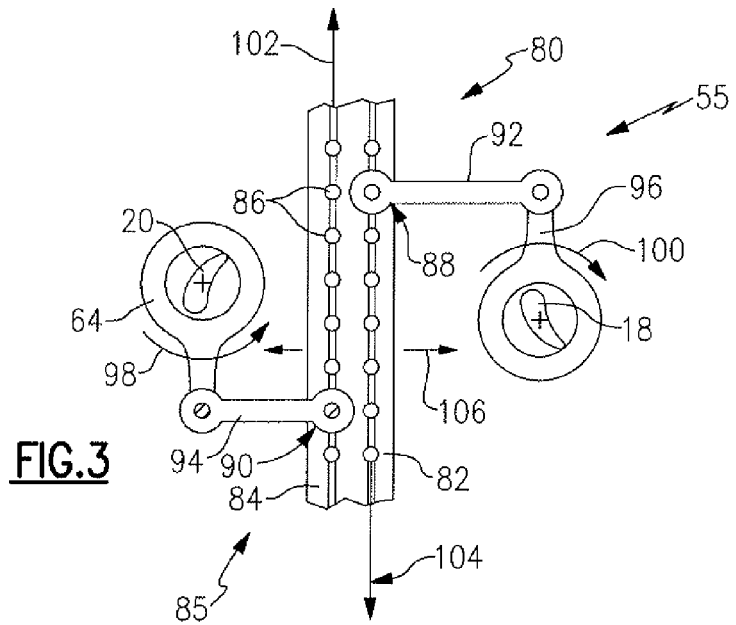
FIG. 3 is a cross-sectional view of an example translation system for controlling propeller pitch in the example counter rotating propeller system.

Referring to FIG. 3 with continued reference to FIG. 2, the example counter rotating propeller system 14 includes a collective blade angle actuation system 55 that provides for adjustment of blade angle of both the first and second plurality of propeller blades 18, 20. The example collective blade control system 55 includes a single actuator 56 to control blade angle of both the first and second plurality of propeller blades 18, 20.

The actuator 56 is disposed within the second hub 30. The example actuator 56 includes a piston 71 that moves axially as indicated by arrows 62 within a piston chamber 73. The piston 71 includes a seal 75 such that hydraulic pressure communicated by the transfer tube 68 causes a corresponding axial movement of the piston 71. The piston 71 drives a yoke plate 58 along the axis A. The yoke plate 58 includes a groove 60 within which a guide pin 66 fits. The guide pin 66 is offset from the axis 54 about which the propeller blades 20 rotate such that axial movement from the yoke plate 58 is translated into rotational movement about the axis 54 of the propeller blade 20.

Axial movement indicated by arrow 78 of the yoke plate 58 results in the desired rotation or pitch alteration of the propeller blades 20. The first plurality of blades 18 also must be comparably adjusted. A translation mechanism 85 communicates movement of the second plurality of blades to the first plurality of blades 18 to move the first plurality of propeller blades about the axis 52.

Figure 6:
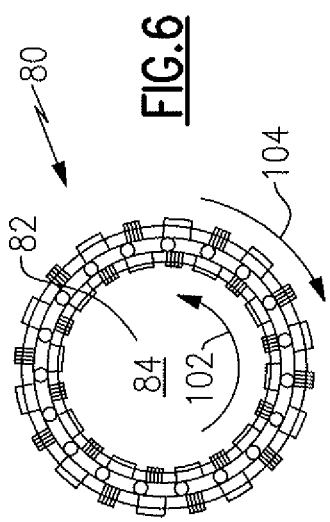
FIG. 6 is a schematic view of counter rotating first and second parts of the example bearing and generator assembly.

The translation mechanism 85 includes a bearing/generator assembly 80 that includes a first part 82 and a second part 84. Between the first side 82 and the second side 84 are a plurality of thrust bearings 86 that translate axial motion between a first cam arm 92 and a second arm 94. The first and second parts 82, 84 are concentric rotating rings that rotate relative to each other in opposite directions about the axis A (Best shown in FIG. 6).

Figure 4:
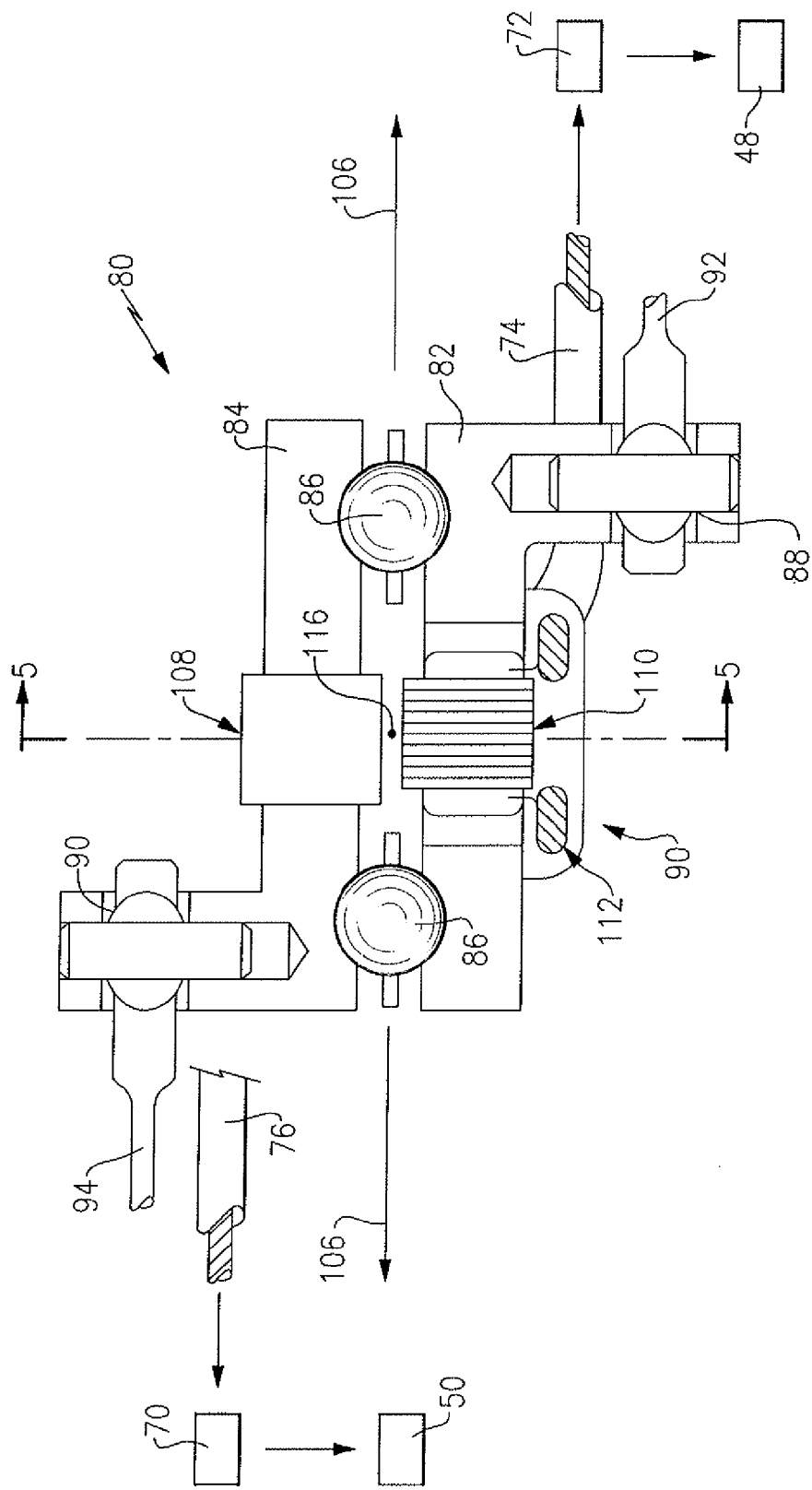
FIG. 4 is a cross-sectional view of an example bearing including a generator for producing electric power for a de-icing system.
Figure 5:
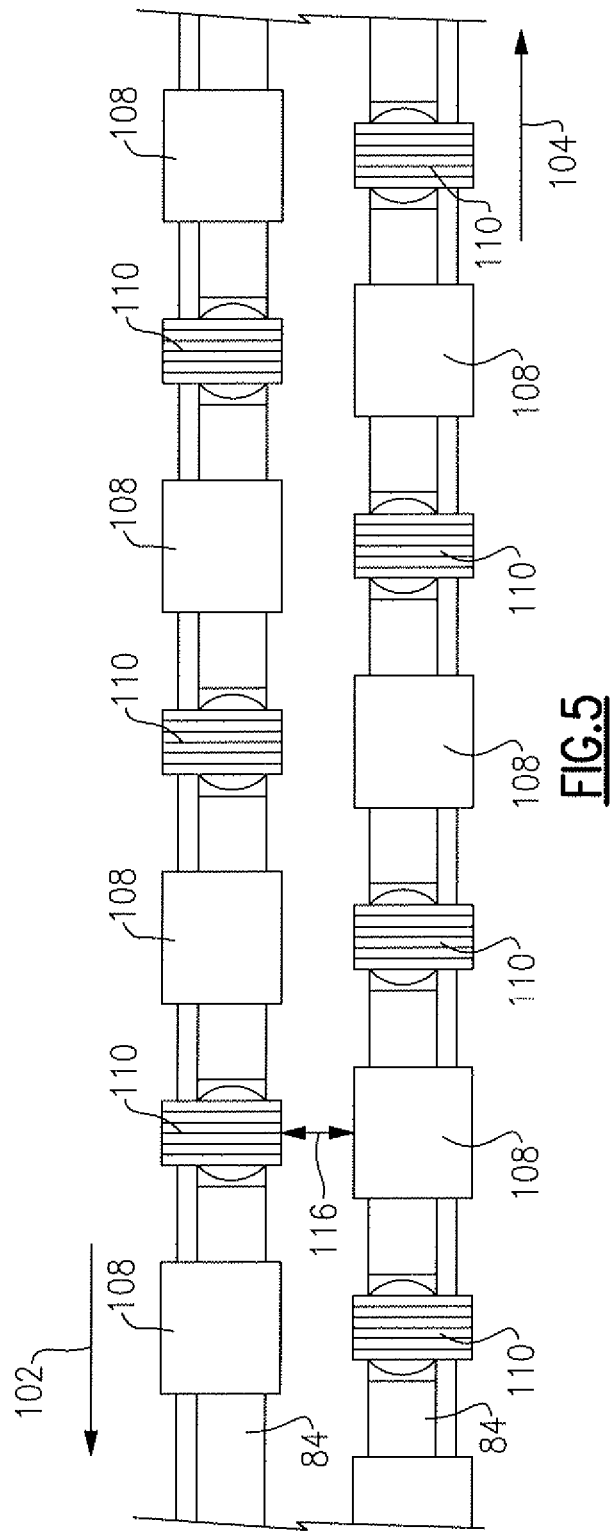
FIG. 5 is another sectional view of the example generator mounted within the bearing assembly.

Referring to FIGS. 4 and 5, with continued reference to FIG. 2, the bearing/generator assembly 80 includes a plurality of permanent magnets 108 and coil assemblies 110 separated by a small air gap 116. The relative rotation between first and second parts 82, 84 of the bearing/generator assembly 80 provides for the generation of electric power. Electric power is created by the induction of current within the coils 110 proximate to the moving magnetic fields generated by the plurality of permanent magnets 108. The electric power created by the bearing/generator assembly 80 provides the electric energy required to drive the heating elements 48, 50 mounted to the first and second pluralities of propeller blades 18, 20.

Power generated by the bearing/generator assembly 80 is routed through _electric leads (conductors) 74, 76 to corresponding controllers mounted in each of the first and second hubs 26, 30. A first controller 72 is mounted within the first hub 26 and a second controller 70 is mounted within the second hub 30. The controllers control implementation of electric energy to each of the heating elements 48, 50. The example heating elements 48, 50 comprise resistive heating elements that are mounted to or integrally within each of the plurality of blades 18, 20. By providing electrical energy to the heating elements 48, 50 the tips of their propeller blades are brought to a temperature that weakens the ice to heat boundary layer, thereby allowing the ice to be shed by centrifugal force. This provides for the elimination of ice that may have been built up onto each of the propeller blades.

The bearing/generator assembly 80 comprises concentrically rotating rings (best shown in FIG. 6) that rotate relative to each other and also provides for the translation of an angular position between the first and second propeller blade assemblies 18, 20. Because the separate propeller assemblies 18, 20 are rotating in opposite directions, a high differential speed is present that in concert with the enlarged diameter provides for the implementation of a low weight generator.

The bearing/generator assembly 80 includes the first part 84 and the second part 82 that rotate relative to each other about the axis A. The relative rotation between the two parts 82, 84 induce a current in the coil 110 that is driven through the conductor 74 to the controller 72. The coil 110 is provided in the part 82 and thereby provides power through the conductor 74 for the controller 72 disposed within the first hub 26. The permanent magnet 108 and coil 110 are separated by the gap 116 that is defined to provide the desired induction of current within the coil 110. The current induced into the coil 110 is driven through conduits 112 into conductor 74. A separate controller 118 may be utilized to communicate and direct operation of the heating elements 48, 50. In this example, the controller 118 is mounted outside of the propeller system 14 and communicates with the controllers 70, 72 in a wireless manner. Moreover, the controllers 70, 72, may also communicate over a wired link, or other wireless communication method and/or protocol. In either case the electric power required from the aircraft is greatly diminished because only power for communications is required.

Referring to FIG. 5 with reference to FIG. 3, each of the first and second parts 82, 84 include both permanent magnets 108 and coils 110. This provides for the generation of electric power for both the first and second hubs 26, 30. As appreciated, the relative rotation between the first part 82 and second part 84 of the bearing/generator assembly 80 require separate leads and coils to provide power to the separate counter rotating propeller assemblies.

The bearing/generator assembly 80 is movable in an axial direction as is indicated by arrows 106 (FIG. 4). The axial movement 106 is part of the translation function of the bearing/generator assembly 80. The translation function provides for the translation of pitch adjustment between the first plurality of propeller blades 18 and the second plurality of propeller blades 20.

Translation of pitch is accomplished through cam arms 92 and 94 that are each pivotally connected by way of pivots 88 and 90 to the bearing/generator assembly 80. The axial movement in the direction indicated by arrow 106 operates independent of the generator function. The generator function continues operation during all relative rotation between the first and second parts 82, 84 of the bearing/generator assembly 80. As appreciated, during any operation of the modular propeller system 14 there will be a relative rotation between the first and second parts 82, 84 of the bearing/generator assembly 80. This relative rotation produces the electric energy desired to power the heating elements 48, 50 to prevent ice accumulation.

Movement of the bearing/generator assembly 80 is transferred through the thrust bearings 86 and the first cam arm 92. The first cam arm 92 is pivotally attached to the bearing 80 at the pivot 88 on one end and to a cam plate 96 that supports rotation of the first plurality of propeller blades 18. The thrust bearings 86 allow for relative rotation about the axis A in opposite directions as indicated by arrows 102 and 104. Accordingly, the bearing/generator assembly 80 allows for relative rotation between the first part 82 and the second part 84 while also providing for translation of axial motion in the direction of arrows 106.

As should be appreciated, although the cam arms 94 and 92 are shown to be substantially equal in the example illustrations. The cam arms 92 and 94 can be of any lengths desired to provide a corresponding movement between the first and second pluralities of propeller blades 18, 20. In some instances, it may be desirable to adjust the propeller blades on the first and second hubs 26, 30 in a corresponding but not equal manner. Such movements can be provided by adjusting a length of each of the first and second cam arms 92, 94 and may also be adjusted and varied by specific configuration of the cam plates 96 and 64. In this example, rotation in the direction indicated by arrow 98 of the second plurality of propeller blades 20 results in a corresponding but opposite rotation in a direction indicated by arrow 100 of the first plurality of propeller blades 18.

Accordingly, the disclosed de-icing system for the counter rotating propeller system 14 generates electric power with the bearing/generator assembly 80 that is also utilized to translate blade pitch adjustments between counter rotating propeller blades. Moreover, generating electric power from the within the propeller system eliminates slip ring and brush electrical connections.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A de-icing system for a counter rotating propeller system comprising:
   a first rotating hub and a second rotating hub that are counter rotating and that support a corresponding first plurality of propeller blades and a second plurality of propeller blades rotatable about a first axis, wherein each of the first plurality of propeller blades and the second plurality of propeller blades are rotatable about a second axis transverse to the first axis for adjusting a desired blade pitch;
   an actuator for driving rotation of one of the first plurality of propeller blades and the second plurality of propeller blades about the second axis;
   a transfer mechanism for translating rotation to another of the first plurality of propeller blades and the second plurality of propeller blades about the second axis, the transfer mechanism including a bearing assembly having a first part rotating with the first hub and a second part rotating with the second hub wherein the transfer mechanism includes a respective cam plate supporting one of the first plurality of propeller blades and the second plurality of propeller blades and a corresponding cam arm connecting each cam plate to the bearing assembly;
   a generator mounted within the bearing assembly for generating electric power; and
   a heating element mounted to at least one propeller blade of the first plurality of propeller blades and the second plurality of propeller blades supported on each of the first hub and the second hub receiving electric power from the generator.

2. The de-icing system as recited in claim 1, wherein the generator comprises a plurality of coils within one of the first part and the second part and a plurality of magnets in another of the first part and the second part and relative rotation between the plurality of magnets and the coils generates an induced electric current in the plurality of coils.

3. The de-icing system as recited in claim 2, wherein the plurality of coils comprises a first plurality of coils disposed within the first part of the bearing assembly and a second plurality of coils disposed within the second part of the of bearing assembly and the plurality of magnets comprises a first plurality of magnets disposed within the first part of the bearing assembly and a second plurality of magnets disposed within the second part of the bearing assembly.

4. The de-icing system as recited in claim 3, wherein the first plurality of coils alternates with the first plurality of magnets about a circumference of the first part of the bearing assembly for supplying electric power to heating elements mounted to the first plurality of propeller blades and the second plurality of coils alternates with the second plurality of magnets about a circumference of the second part of the bearing assembly for providing power to heating elements mounted to the second plurality of propeller blades.

5. The de-icing system as recited in claim 4, including a first controller for controlling power from the first plurality of coils and a second controller for controlling power from the second plurality of coils.

6. The de-icing system as recited in claim 5, wherein the first and second controllers receive commands from a main controller located remotely from the counter rotating propeller system.

7. The de-icing system as recited in claim 1, wherein the bearing assembly is movable along the first axis for transferring rotation about the second axis between the first plurality of propeller blades and the second plurality of propeller blades.

8. The de-icing system as recited in claim 1, wherein the first part and the second part of the bearing assembly comprise counter rotating circumferential rings supported between the first hub and second the second hub.

9. A method of generating power for de-icing propeller blades of a counter rotating propeller system comprising:
   supporting a corresponding first plurality of propeller blades and a second plurality of propeller blades on a first hub and a second hub that are counter rotating and rotatable about a first axis;
   mounting a transfer mechanism between the first plurality of propeller blades and the second plurality of propeller blades to vary propeller blade pitch, the transfer mechanism including a bearing assembly having a first part rotating with the first hub supporting the first plurality of propeller blades and a second part rotating with the second hub supporting the second plurality of propeller blades, wherein the transfer mechanism includes a respective cam plate supporting one of the first plurality of plurality of propeller blades and the second plurality of propeller blades and a corresponding cam arm connecting each cam plate to the bearing assembly;
   mounting a generator within the bearing assembly for generating electric power; and
   routing the electric power to a heating element mounted to at least one propeller blade of the first plurality of propeller Hades and the second plurality of propeller blades supported on each of the first hub and the second hub receiving electric power from the generator.

10. The method as recited in claim 9, including mounting a first plurality of coils and a first plurality of permanent magnets within the first part and mounting a second plurality of coils and a second plurality of magnets within the second part and rotating the first part relative to the second part to generate electric power within the first and second plurality of coils.

11. The method as recited in claim 9, including the step of moving the bearing assembly axially for transferring pitch adjustments between the first plurality of propeller blades and the second plurality of propeller blades.

12. The method as recited in claim 11, including controlling pitch of one of the first plurality of propeller blades and the second plurality of propeller blades with an actuator mounted within a corresponding one of the first hub and the second hub and transferring the pitch to another of the first plurality of propeller blades and the second plurality of propeller blades through axial movement of the bearing assembly.

13. The method as recited in claim 9, including the step of controlling power to the heating elements mounted to the first plurality of propeller blades and the second plurality of propeller blades with a corresponding one of a first controller and a second controller disposed within a corresponding one of the first hub and the second hub.

14. The method as recited in claim 13, including the step of directing operation of the first controller and the second controller from a main controller mounted remotely from the counter rotating propeller system.

15. A counter rotating propeller system comprising:
- a first rotating hub and a second rotating hub that are counter rotating and that support a corresponding first plurality of propeller blades and a second plurality of propeller blades rotatable about a first axis, wherein each of the first plurality of propeller blades and the second plurality of propeller blades are rotatable about a second axis transverse to the first axis for adjusting a desired blade pitch;
- a first plurality of cam plates supporting rotation of the first plurality of propeller blades about the second axis and a second plurality of cam plates supporting rotation of the second plurality of propeller blades about the second axis;
- an actuator for driving rotation of one of the first plurality of propeller blades and the second plurality of propeller blades about the second axis;
- a transfer mechanism for translating rotation to another of the first plurality of propeller blades and the second plurality of propeller blades about the second axis, the transfer mechanism including a bearing assembly having a first part rotating with the first hub and a second part rotating with the second hub; and
- a plurality of cam arms connecting corresponding ones of the first plurality of cam plates and the second plurality of cam plates to the bearing assembly.

16. The counter rotating propeller system as recited in claim 15, including a generator mounted within the bearing assembly for generating electric power; and
- a heating element mounted to at least one propeller blade of the first plurality of propeller blades and the second plurality of propeller blades supported on each of the first hub and the second hub receiving electric power from the generator.

17. The counter rotating propeller system as recited in claim 16, wherein the generator comprises a plurality of coils within one of the first part and the second part and a plurality of magnets in another of the first part and the second part and relative rotation between the plurality of magnets and the coils generates an induced electric current in the plurality of coils.

18. The counter rotating propeller system as recited in claim 17, wherein the plurality of coils comprises a first plurality of coils disposed within the first part of the bearing assembly and a second plurality of coils disposed within the second part of the of bearing assembly and the plurality of magnets comprises a first plurality of magnets disposed within the first part of the bearing assembly and a second plurality of magnets disposed within the second part of the bearing assembly.

* * * * *

UNITED STATES PATENT AND TRADEMARK OFFICE
CERTIFICATE OF CORRECTION

| | | |
|---|---|---|
| PATENT NO. | : 8,757,972 B2 | Page 1 of 1 |
| APPLICATION NO. | : 13/208741 | |
| DATED | : June 24, 2014 | |
| INVENTOR(S) | : Perkinson | |

It is certified that error appears in the above-identified patent and that said Letters Patent is hereby corrected as shown below:

IN THE CLAIMS:

Claim 9, column 6, line 41; delete "Hades" and replace with --blades--

Signed and Sealed this
Seventh Day of October, 2014

Michelle K. Lee
*Deputy Director of the United States Patent and Trademark Office*